US008504999B2

(12) United States Patent
Partridge et al.

(10) Patent No.: US 8,504,999 B2
(45) Date of Patent: Aug. 6, 2013

(54) SYSTEM AND METHOD FOR TRANSFERRING CODE TO A DATA PRODUCER

(75) Inventors: Kurt E. Partridge, Palo Alto, CA (US); Maurice K. Chu, San Mateo, CA (US); James M. A. Begole, San Jose, CA (US); Mark W. Newman, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1295 days.

(21) Appl. No.: 11/543,738

(22) Filed: Oct. 5, 2006

(65) Prior Publication Data
US 2008/0098367 A1 Apr. 24, 2008

(51) Int. Cl.
*G06F 9/45* (2006.01)
*G06F 9/44* (2006.01)
*G06F 15/16* (2006.01)

(52) U.S. Cl.
USPC .......................... 717/136; 717/104; 709/202

(58) Field of Classification Search
None
See application file for complete search history.

(56) References Cited

U.S. PATENT DOCUMENTS

| | | | |
|---|---|---|---|
| 6,691,151 B1 * | 2/2004 | Cheyer et al. | 709/202 |
| 7,281,236 B1 * | 10/2007 | Galvin et al. | 717/104 |
| 7,316,000 B2 * | 1/2008 | Poole et al. | 717/104 |
| 7,779,394 B2 * | 8/2010 | Homing et al. | 717/136 |
| 7,797,688 B1 * | 9/2010 | Dubagunta | 717/136 |
| 7,805,732 B2 * | 9/2010 | Manzano et al. | 719/317 |
| 2002/0116540 A1 * | 8/2002 | Maeda et al. | 709/317 |
| 2004/0006589 A1 * | 1/2004 | Maconi et al. | 709/202 |
| 2004/0153499 A1 * | 8/2004 | Heddaya et al. | 709/202 |
| 2005/0210456 A1 * | 9/2005 | Chen et al. | 717/136 |
| 2006/0085558 A1 | 4/2006 | Solomon | |
| 2006/0117295 A1 * | 6/2006 | Wu et al. | 717/104 |

FOREIGN PATENT DOCUMENTS

GB 2333169 A 7/1999

OTHER PUBLICATIONS

Wilson et al, A Framework for Linking Distributed Simulations Using Software Agents, Proceedings of the IEEE vol. 89 No. 2, Feb. 2001, pp. 186-200, Retrieved on [Aug. 18, 2010] Retrieved from the Internet: URL<http://ieeexplore.ieee.org/stamp/stamp.jsp?tp=&arnumber=910854>.*

Caripe et al, Network Awareness and Mobile Agent Systems, IEEE Communications Magazine Jul. 1998, pp. 44-49, Retrieved on [Aug. 18, 2010].*

(Continued)

*Primary Examiner* — Thuy Dao
*Assistant Examiner* — Cheneca Smith
(74) *Attorney, Agent, or Firm* — Shun Yao; Park, Vaughan, Fleming & Dowler LLP (57) ABSTRACT

One embodiment of the present invention provides a system that selectively transfers code to a data producer in a networked system. In this system, the data producer generates data and then sends the data to a device. The device receives the data from the data producer, and then uses code on the device to perform a processing operation on the data. Next, the system analyzes characteristics of the data to determine whether performing the processing operation on the data producer can reduce resource usage. If so, the system transfers the code from the device to the data producer, and subsequently executes the code on the data producer. By executing the code on the data producer, the system can optimize resource usage in the networked system.

19 Claims, 4 Drawing Sheets

(56) References Cited

OTHER PUBLICATIONS

Gray et al, D'Agents: Applications and Performance of Mobile-Agent System, Nov. 2001, pp. 1-34, Retrieved on [Feb. 2, 2011] Retrieved from the Internet: URL< http://actcomm.dartmouth.edu/gvc/papers/applications_and_perform.pdf>.*

Satoh, Ichiro. Bridging Physical and Virtual Worlds with Mobile Agents, IPSJ Journal, vol. 44, No. 8, pp. 2218-2229, Aug. 2003, Retrieved on [May 18, 2011], Retrieved from the Internet: URL<http://research.nii.ac.jp/~ichiro/papers/satoh-spatialagent.pdf>.*

Storey et al, MARE:Resource Discovery and Configuration in Ad Hoc Networks, Mobile Networks and Applications, 2002, pp. 377-387, Retrieved on [Dec. 1, 2011] Retrieved from the Internet:URL<http://delivery.acm.org/10.1145/590000/582471/>.*

Chow et al. State-On-Demand Execution for Adaptive Component-based Mobile Agent Systems, ICPADS '04 Proceedings of the Parallel and Distributed Systems, Tenth International Conference, 2004, pp. 46-53, Retrieved on [Nov. 2, 2012] Retrieved from the Internet: URL <http://ieeexplore.ieee.org/stamp/stamp.jsp?tp=&arnumber=1316079>.*

Wu et al. On computing mobile agent routes for data fusion in distributed sensor networks, IEEE transactions on Knowledge and Data Engineering, Jun. 2004, pp. 740-753, Retrieved on [Mar. 21, 2013] Retrieved from the Internet: URL<http://ieeexplore.ieee.org/stamp/stamp.jsp?tp=&arnumber=1294894<.*

Ying et al. Mobile agent-based policy management for wireless sensor networks, 2005 International Conference on Wireless Communications, Networking and Mobile Computing, Sep. 2005, pp. 1207-1210, Retrieved on [Mar. 21, 2013] Retrieved from the Internet: URL<http://ieeexplore.ieee.org/stamp/stamp.jsp?tp=&arnumber=1544270>.*

* cited by examiner

SYSTEM AND METHOD FOR TRANSFERRING CODE TO A DATA PRODUCER

GOVERNMENT LICENSE RIGHTS

This invention was made with United States Government support under Contract No. 70NANB3H3052 awarded by NIST. The United States Government has certain rights in the invention.

BACKGROUND

1. Field of the Invention

The present invention relates generally to the problem of distributing software across a networked system. More specifically, the present invention relates to a system and method for transferring code to a data producer.

2. Related Art

Wireless sensor networks are finding applications in a wide range of areas, including disaster recovery, homeland security, infrastructure monitoring, habitat monitoring, and pervasive computing environments. A wireless sensor network is typically comprised of a collection of devices embedded in a physical environment which gather information, perform local computations, and communicate with other devices and hosts through a wireless network.

Wireless sensor networks pose unique challenges because the devices that comprise wireless sensor networks often have more stringent resource constraints than devices in traditional networks. For example, network bandwidths are often low, and sensors may have very little power available for transferring large amounts of data. Such constraints hamper sensor network performance by, for instance, affecting data quality and sensor node longevity. Additionally, different sensors may generate the same kind of data, but in differing formats, for instance when heterogeneous sensors are produced by different manufacturers without a well-defined standard.

Hence, what is needed is a system and method that facilitates efficiently gathering data from networked systems without the above-described problems.

SUMMARY

One embodiment of the present invention provides a system that selectively transfers code to a data producer in a networked system. In this system, the data producer generates data and then sends the data to a device. The device receives the data from the data producer, and then uses code on the device to perform a processing operation on the data. Next, the system analyzes characteristics of the data to determine whether performing the processing operation on the data producer can reduce resource usage. If so, the system transfers the code from the device to the data producer, and subsequently executes the code on the data producer. By executing the code on the data producer, the system can optimize resource usage in the networked system.

In a variation on this embodiment, the processing operation involves: preprocessing the data; compressing the data; removing an item from the data; adding an item to the data; filtering the data; transforming the data from a first format to a second format; and/or archiving an item from the data at the location where the code executes.

In a further variation, the system executes the code on the data producer to reduce the amount of data transferred from the data producer to the device, thereby saving power and/or consuming less network bandwidth.

In a further variation, the data producer and the device communicate through a wireless network.

In a variation on this embodiment, the system analyzes the characteristics of the data using a distributed framework that manages location and routing information. This distributed framework monitors the needs and characteristics of a set of distributed applications that execute simultaneously and determines whether moving the code would improve system performance and/or resource utilization.

In a further variation, the code is an application binary that can be cached on a device and/or a central repository. When transferring the code from the device to the data producer, the system can: determine whether the application binary is already available on the data producer; and/or send information to the data producer that allows the data producer to find and retrieve the application binary.

In a further variation, when the system receives an event on the device while transferring the code from the device to the data producer, the system forwards information related to this event to the data producer in addition to the code. By forwarding such information, the system can deliver and/or handle events that might otherwise be ignored while the code is transferring.

In a further variation, the system forwards information related to the event by: handling the event on the device and transferring state information to the data producer when the code begins to execute on the data producer; storing the event on the device and then transferring the event to the data producer when the code begins to execute on the data producer; and/or detecting that the event is a duplicate event which was received on both the data producer and the device, which obviates the need to forward the information related to the event to the data producer.

In a further variation, the system begins the process of transferring the code from the device to the data producer by first stopping the execution of the code on the device. During the transfer process, the system maintains a copy of the code on the device, and determines whether any errors occur during the transfer of the code. If so, the system re-starts the code on the device.

In a variation on this embodiment, the data producer is a computing device with limited resources that include one or more of the following: a limited power source; a network connection with limited bandwidth and/or high latency; a processor with limited computation capability; and/or a small memory.

In a variation on this embodiment, the data producer is a sensor in a sensor network. Note that data producers can also include media servers and databases.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Transferring Code to a Data Producer

A monolithic operating system for a high-performance computing device often includes a large code base that supports a wide range of devices and functionality. A wireless sensor device, on the other hand, is typically provisioned with: a processor with limited computation capability; a small memory; a limited power source; and/or a network connection with limited bandwidth and/or high latency. Data-producing sensor devices are typically inexpensive, so that a large number of the devices can be deployed. Such devices typically include a very limited operating system which is provisioned to download new code on demand, for instance to support a new application or to update an installed application.

In one embodiment of the present invention, a distributed framework provides a mobile agent architecture for a networked system, wherein each agent in the architecture is a software entity capable acting with a certain degree of autonomy in order to accomplish tasks on behalf of a user. This framework may support multiple applications that run simultaneously in a distributed fashion. For instance, the framework may use an external monitoring node to detect the set of applications using a given data producer. This enables the system to download to the given data producer code which is relevant to individual or multiple applications.

An operation in the distributed framework may involve code running on one or more nodes participating in the distributed framework. One common operation for the distributed framework involves managing location information by: tracking the physical locations of data producers in a networked system; using location information to make decisions at the system level to route data and to migrate agents; and enabling agents to move from node to node depending on data characteristics. For instance, in a network of camera sensors that tracks a moving object, the framework may determine that transferring a small piece of code for tracking the object between the sensors is more efficient than transferring large amounts of image data to a non-mobile tracking agent, since the former uses substantially less network bandwidth and hence consumes less power.

In one embodiment of the present invention, receivers of data from a data producer can upload processing instructions to the sending data producer so that data can be processed prior to transmission. In such a system, processing data on the data producer reduces the size of the data, and hence consumes less bandwidth and transmission power. Furthermore, the processing step can convert the data to a harmonized format.

A processing operation can involve, but is not limited to, one or more of the following:
preprocessing the data;
compressing the data;
removing an item from the data;
adding an item to the data;
filtering the data;
transforming the data from a first format to a second format; and/or
archiving an item from the data locally at the node where the code executes.

Figure 1:
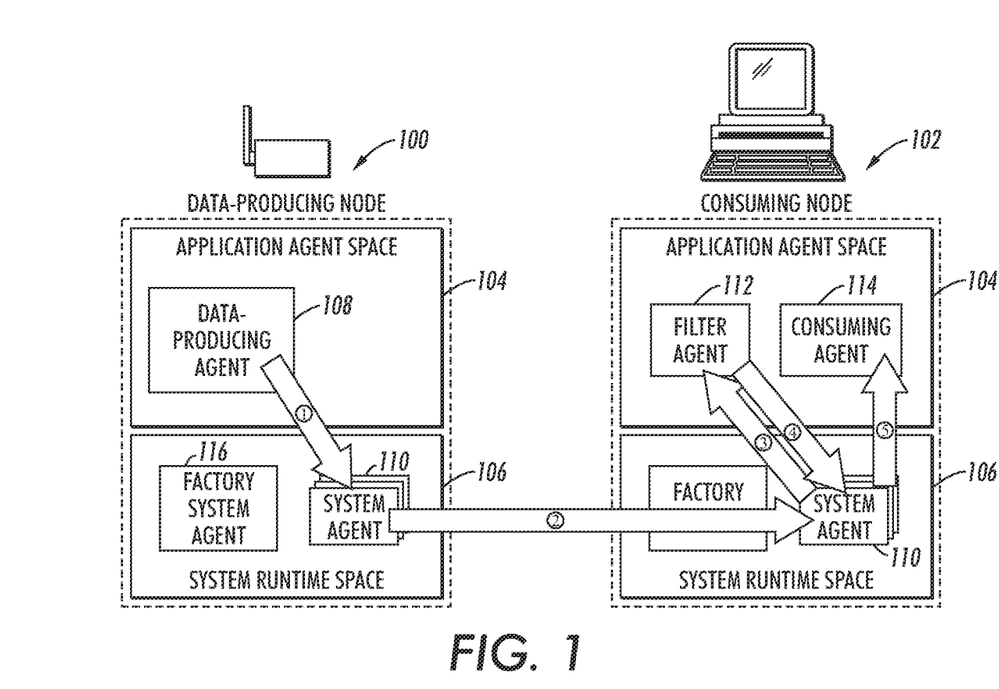
FIG. 1 illustrates a networked system with a data-producing node and a consuming node in accordance with an embodiment of the present invention.

FIG. 1A illustrates a networked system in which the system generates data on a data-producing node 100, transfers the data to a consuming node 102, and then filters the data to extract interesting data for a consuming agent. Both nodes include an application agent space 104, in which application agents execute, and a system runtime space 106, in which system agents execute. Note that in FIGS. 1A-1C, the size of an arrow indicates the size of the corresponding data stream.

As is illustrated in FIG. 1A, a data-producing agent 108 gathers a set of data, and then passes the data to a system agent 110 in the data-producing node's 102 runtime system (arrow 1). Next, the system agent 110 forwards the raw data to a system agent 110 on the consuming node 102, thereby consuming a large amount of bandwidth and power (arrow 2). Then, the system agent 110 on the consuming node 102 passes the data to agents that have previously expressed interest in the data, such as the filter agent 112 (arrow 3). Next, the filter agent 112 proceeds to extract the desired data, and passes a much smaller set of relevant filtered data to the runtime system (arrow 4) for redistribution. The system then passes the filtered data to the consuming agent 114 (arrow 5), which can, for instance, display the data to a user.

FIG. 1B illustrates the process of transferring the filter agent 112 to the data-producing node 100. This can take place, for example, when the system determines that system performance and/or resource consumption could be improved by executing the filter agent 112 on the data prior to transmitting the data to the consuming node 102. For instance, the filter agent 112 might determine that moving to the data-producing node 100 would improve performance, and could then send a "move" event to the factory system agent 116 of the consuming node 102 (arrow 1) to initiate the move.

Note that the factory system agents 116 manage agent mobility for the system. For example, the factory system agent 116 on the consuming node 102 retrieves binaries for the filter agent from the agent binary storage 118 (arrows 2 and 3), and then collects the current state from the filter agent 112 and destroys the instance of the filter agent 112 on the consuming node 102 (arrows 4 and 5). Next, the factory system agent 116 on the consuming node 102 packages up the filter agent state and binaries and sends the package to the factory system agent 116 of the data-producing node 100 (arrow 6). The factory system agent 116 of the data-producing node 100 stores the binaries into the agent binary storage 118 of the data-producing node 100 (arrow 7), after which the system dynamically loads the binaries from the agent binary storage 118 into the runtime system, thereby creating a new instance of the filter agent 120 on the data-producing node 100 (arrow 8). Lastly, the factory system agent 116 on the data-producing node 100 passes the saved state collected from the filter agent 112 on the consuming node 102 to the new filter agent 120, so that the new filter agent 120 can resume from where the previous instance halted.

FIG. 1C illustrates the operation of the networked system after the transfer of the filter agent 112 to the data-producing node 100. During this process, the data-producing agent 108 gathers a set of data and passes the data to a system agent 110 in the node's runtime system (arrow 1). This system agent 110 redistributes the data to interested agents, which now includes the new instance of the filter agent 120 on the data-producing node 100 (arrow 2). Next, the new filter agent 120 extracts a desired set of data, and passes the resulting smaller set of filtered data to the runtime system (arrow 3). The set of filtered data is then passed to system agents 100 on other nodes in the system that have expressed interest in the data, including, in this case, on the consuming node 102 (arrow 4). Note that a smaller amount of bandwidth, and hence less transmission power, is used in FIG. 1C when compared to FIG. 1A. Finally, the system agent 110 on the consuming node 102 passes the filtered data to the consuming agent 114 (arrow 5).

Figure 2:
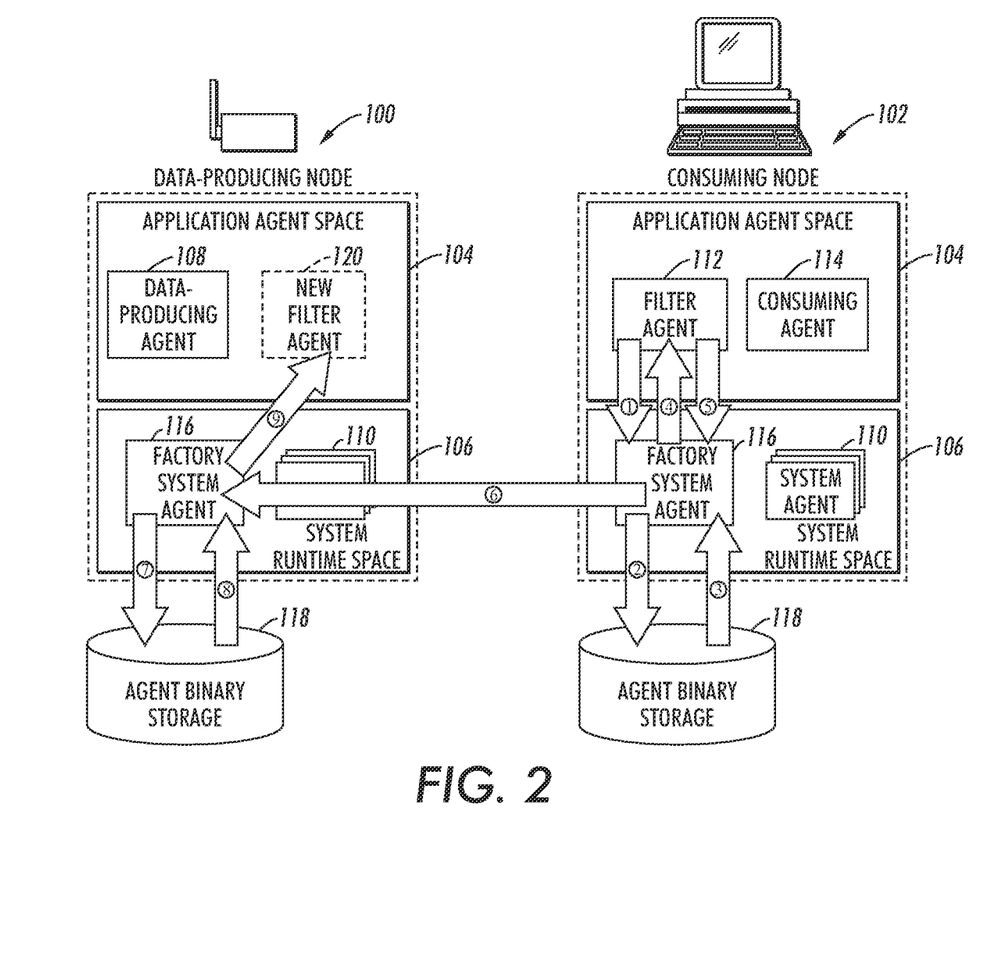
FIG. 2 illustrates the process of transferring a filter agent to a data-producing node in accordance with an embodiment of the present invention.
Figure 3:
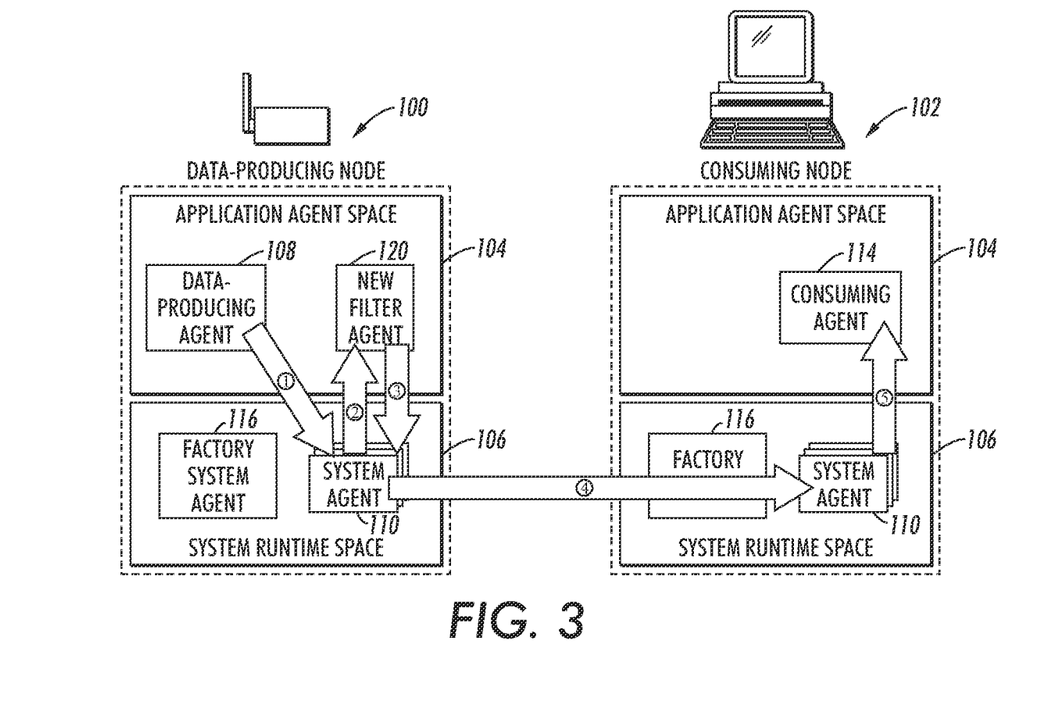
FIG. 3 illustrates a networked system after the transfer of a filter agent in accordance with an embodiment of the present invention.
Figure 4:
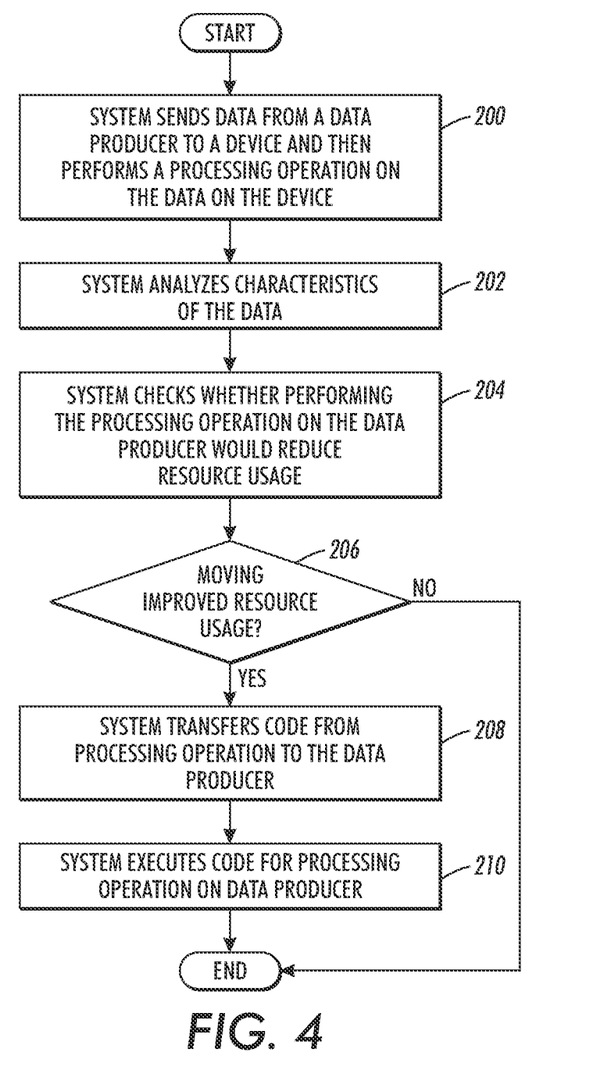
FIG. 4 presents a flow chart illustrating the process of transferring code to a data producer in accordance with an embodiment of the present invention.

FIG. 2 presents a flow chart illustrating the process of transferring code to a data producer. Initially, the system sends data from a data producer to a device, and then performs a processing operation on the data on the device (step 200). Next, the system analyzes characteristics of the data (step 202), and attempts to determine whether performing the processing operation on the data producer could reduce resource usage (step 204). If so (step 206), the system transfers code for the processing operation to the data producer (step 208), and then proceeds to execute the code for the processing operation on the data producer (step 210).

In one embodiment of the present invention, the system determines whether to move an agent based on analysis and/or heuristics. For instance, the system may monitor the size of a data stream, track whether a filtering agent expends or contracts the data stream, and can then choose to move a contracting filtering agent as close to the data source as possible. Note that determining such move operations may involve complex network optimization analysis that takes into account node location, resource contention and negotiation, load balancing, power trade-offs, and predictions of network traffic and application characteristics.

Error Recovery, System Robustness, and Optimizations

Distributed systems typically comprise many distributed components and often do not provide atomic operations, and hence are susceptible to partial failures. A distributed system should handle such partial failures gracefully and minimize their impact on the rest of the system. Hence, a migration system should include mechanisms to handle unsuccessful agent migration.

In one embodiment of the present invention, the system prepares for failure by maintaining a copy of an agent being moved on the source node until the system has received confirmation of a successful migration. For instance, if the source node receives an error message, or detects that the moved agent has not resumed on the remote node after some timeout interval, the system can then restart agent on the source node with minimal overhead.

In one embodiment of the present invention, the system provides robust event delivery during agent migration. During an agent move, the system can put the agent to sleep, queue the set of incoming events destined for the agent, and then forward the events to the new instance of the agent on the new node when the new instance is ready. If a move aborts or fails, the agent on the source node can be re-started, and the agent proceeds to handle the stored events in the queue. In an alternative approach, the system can keep the agent active on the source node during the move, and, depending on the application, can synchronize the state between the two instances of the agent before halting the agent on the source node.

Note that in some agent systems events are stateless and agents register their interest in specific events with the system framework. In this type of system, the system framework ensures that events are forwarded to the agents correctly. Such systems simplify adding to application features, but they depend on the system to handle any potential complications. For instance, to avoid delivering duplicate events to an agent after a move, the system should not deliver any events to the newly-started instance of the agent on the destination node until all of the queued events have been received and processed. To ensure that no duplicate events are processed, the system may need to maintain state for queued events until the system can be certain that no more duplicates will arrive, which may involve using a distributed global clock.

In one embodiment of the present invention, the system attempts to minimize the amount of code that is transferred for an agent move. For instance, if the network bandwidth is low but latency is not prohibitively high, the system may determine whether a suitable application binary for an agent to be moved is already present (e.g. cached) on the destination node, and can then transfer the application binary only if necessary. Alternatively, in the case of a low-overhead network link with high latency, the system may determine that simply sending the binary in all cases is more efficient. In another embodiment, the destination node might assume responsibility for acquiring the proper application binary and informing the source node when the binary has been obtained. For example, the destination node might retrieve the binary from a central repository and/or a location specified by the source node. Such an arrangement might involve additional state on the source node that tracks failure or difficulty in obtaining the binary on the destination node.

In summary, in one embodiment of the present invention, a system can upload code to a data producer, hence reducing the size of the data sent through the networked system and thereby saving power. By moving processing operations upstream towards the source of a data stream, the system can improve the efficiency and capacity of the networked system.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for selectively transferring code to a data producer in a networked system, wherein the data producer generates data and sends the data to a local computing device, comprising:

receiving, by the local computing device, the data from the data producer;

performing a processing operation on the data to produce processed data;

analyzing characteristics of the processed data to determine whether the processing operation reduces resource utilization including reducing the size of the data, wherein analyzing the characteristics of the processed data involves using a distributed framework that manages location and routing information, wherein the distributed framework monitors the needs and characteristics of a set of distributed applications executing simultaneously, and wherein the distributed framework determines whether performing the move would improve system performance and/or resource utilization; and responsive to determining that the processing operation reduces resource utilization, transferring the processing operation to the data producer so that the data producer resumes the processing operation, wherein transferring the processing operation involves:
retrieving a binary executable version of code associated with the processing operation;
collecting current processing states of the processing operation;
destroying an instance of the processing operation on the local computing device;
packaging the collected processing states and the retrieved binary executable version of the code; and
transferring the package from the local computing device to the data producer to facilitate the data producer to resume execution of the code, wherein the package includes the collected processing states and the retrieved binary executable version of the code.

2. The method of claim 1, wherein performing the processing operation involves one or more of the following:
preprocessing the data;
compressing the data;
removing an item from the data;
adding an item to the data;
filtering the data;
transforming the data from a first format to a second format; and/or
archiving an item from the data at the location where the code executes.

3. The method of claim 2,
wherein executing the code on the data producer reduces the amount of data transferred from the data producer to the device; and
wherein reducing the amount of data transferred saves power and/or consumes less network bandwidth.

4. The method of claim 3, wherein the data producer and the device communicate through a wireless network.

5. The method of claim 1,
wherein the binary executable version of the code is cached on a device and/or a central repository; and
wherein transferring the package that includes the retrieved binary executable version of the code from the device to the data producer involves one or more of the following:
determining whether the binary executable version of the code is already available on the data producer; and/or
sending to the data producer information that allows the data producer to find and retrieve the binary executable version of the code.

6. The method of claim 1, wherein transferring the package that includes the binary executable version of the code from the device to the data producer further involves:
receiving an event on the device while transferring the package; and
forwarding information related to the event to the data producer along with the package;
wherein forwarding information related to the event enables the distributed framework to deliver and/or handle events that might otherwise be ignored while the package is transferring.

7. The method of claim 6, wherein forwarding the information related to the event involves one or more of the following:
handling the event on the device and transferring state information to the data producer when the code begins executing on the data producer;
storing the event on the device and then transferring the event to the data producer when the code begins executing on the data producer; and/or
detecting that the event is a duplicate event which was received on both the data producer and the device, thereby obviating the need to forward the information related to the event to the data producer.

8. The method of claim 6, wherein transferring the package that includes the retrieved binary executable version of the code from the device to the data producer further involves:
stopping the execution of the code on the device;
maintaining a copy of the code on the device;
detecting an error in the transfer of the code; and
re-starting the code on the device.

9. The method of claim 1, wherein the data producer is a computing device with limited resources that include one or more of the following:
a limited power source;
a network connection with limited bandwidth and/or high latency;
a processor with limited computation capability; and/or
a small memory.

10. The method of claim 1, wherein the data producer is a sensor in a sensor network.

11. A non-transitory computer-readable storage medium storing instructions that when executed by a computer cause the computer to perform a method for selectively transferring code to a data producer in a networked system, wherein the data producer generates data and sends the data to a local computing device, the method comprising:
receiving, at the local computing device, the data from the data producer;
performing a processing operation on the data to produce processed data;
analyzing characteristics of the processed data to determine whether the processing operation reduces resource utilization including reducing the size of the data, wherein analyzing the characteristics of the processed data involves using a distributed framework that manages location and routing information, wherein the distributed framework monitors the needs and characteristics of a set of distributed applications executing simultaneously, and wherein the distributed framework determines whether performing the move would improve system performance and/or resource utilization; and
responsive to determining that the processing operation reduces resource utilization, transferring the processing operation to the data producer so that the data producer resumes the processing operation, wherein transferring the processing operation involves:
retrieving a binary executable version of code associated with the processing operation;
collecting current processing states of the processing operation;
destroying an instance of the processing operation on the local computing device;
packaging the collected processing states and the retrieved binary executable version of the code; and
transferring the package from the local computing device to the data producer to facilitate the data producer to resume execution of the code, wherein the package includes the collected processing states and the retrieved binary executable version of the code.

12. The computer-readable storage medium of claim 11, wherein performing the processing operation involves one or more of the following:

preprocessing the data;
compressing the data;
removing an item from the data;
adding an item to the data;
filtering the data;
transforming the data from a first format to a second format; and/or
archiving an item from the data at the location where the code executes.

13. The computer-readable storage medium of claim 12,
wherein executing the code on the data producer reduces the amount of data transferred from the data producer to the device; and
wherein reducing the amount of data transferred saves power and/or consumes less network bandwidth.

14. The computer-readable storage medium of claim 13,
wherein the data producer and the device communicate through a wireless network; and
wherein the data producer is a computing device with limited resources that include one or more of the following:
a limited power source;
a network connection with limited bandwidth and/or high latency;
a processor with limited computation capability; and/or
a small memory.

15. The computer-readable storage medium of claim 11,
wherein the binary executable version of the code is cached on a device and/or a central repository; and
wherein transferring the package that includes the retrieved binary executable version of the code from the device to the data producer involves one or more of the following:
determining whether the binary executable version of the code is already available on the data producer; and/or
sending to the data producer information that allows the data producer to find and retrieve the binary executable version of the code.

16. The computer-readable storage medium of claim 11,
wherein transferring the package that includes the retrieved binary executable version of the code from the device to the data producer further involves:
receiving an event on the device while transferring the package; and
forwarding information related to the event to the data producer along with the package;
wherein forwarding information related to the event enables the distributed framework to deliver and/or handle events that might otherwise be ignored while the package is transferring.

17. The computer-readable storage medium of claim 16,
wherein forwarding the information related to the event involves one or more of the following:
handling the event on the device and transferring state information to the data producer when the code begins executing on the data producer;
storing the event on the device and then transferring the event to the data producer when the code begins executing on the data producer; and/or
detecting that the event is a duplicate event which was received on both the data producer and the device, thereby obviating the need to forward the information related to the event to the data producer.

18. The computer-readable storage medium of claim 16,
wherein transferring the package that includes the retrieved binary executable version of the code from the device to the data producer further involves:
stopping the execution of the code on the device;
maintaining a copy of the code on the device;
detecting an error in the transfer of the code; and
re-starting the code on the device.

19. An apparatus that selectively transfers code to a data producer in a networked system, wherein the data producer generates data and sends the data to a local computing device, comprising:
a receiving mechanism that is coupled to a processor and receives the data from the data producer, the processor configured to perform a processing operation on the data, at the device;
a determination mechanism configured to analyze characteristics of the processed data to determine whether the processing operation reduces resource utilization including reducing the size of the data, wherein analyzing the characteristics of the processed data involves using a distributed framework that manages location and routing information, wherein the distributed framework monitors the needs and characteristics of a set of distributed applications executing simultaneously, and wherein the distributed framework determines whether performing the move would improve system performance and/or resource utilization; and
a moving mechanism configured to transfer the processing operation to the data producer so that the data producer resumes the processing operation, in response to the determination mechanism determining that the processing operation reduces resource utilization, wherein transferring the processing operation involves:
retrieving a binary executable version of code associated with the processing operation;
collecting current processing states of the processing operation;
destroying an instance of the processing operation on the local computing device;
packaging the collected processing states and the retrieved binary executable version of the code; and
transferring the package from the local computing device to the data producer to facilitate the data producer to resume execution of the code, wherein the package includes the collected processing states and the retrieved binary executable version of the code.

\* \* \* \* \*